US011111896B2

(12) United States Patent
Koenen et al.

(10) Patent No.: US 11,111,896 B2
(45) Date of Patent: *Sep. 7, 2021

(54) STARTER MOTOR WITH INTEGRATED SOLID STATE SWITCH

(71) Applicant: BRIGGS & STRATTON, LLC, Wauwatosa, WI (US)

(72) Inventors: Robert John Koenen, Wauwatosa, WI (US); Jason Andrew Hansen, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,565

(22) Filed: Dec. 11, 2019

(65) Prior Publication Data

US 2020/0116115 A1  Apr. 16, 2020

Related U.S. Application Data

(63) Continuation of application No. 15/580,122, filed as application No. PCT/US2016/037996 on Jun. 17, 2016, now Pat. No. 10,550,819.

(Continued)

(51) Int. Cl.
| | |
|---|---|
| *F02N 11/08* | (2006.01) |
| *H02K 23/66* | (2006.01) |
| *H02K 5/14* | (2006.01) |
| *H02K 7/14* | (2006.01) |
| *H02K 11/25* | (2016.01) |
| *H02P 1/18* | (2006.01) |
| *H02P 29/60* | (2016.01) |

(Continued)

(52) U.S. Cl.
CPC ........ *F02N 11/087* (2013.01); *F02N 11/0862* (2013.01); *F02N 11/101* (2013.01); *F02N 11/105* (2013.01); *H02H 7/0852* (2013.01); *H02K 5/148* (2013.01); *H02K 7/14* (2013.01); *H02K 11/25* (2016.01); *H02K 23/66* (2013.01); *H02P 1/18* (2013.01); *H02P 29/60* (2016.02); *F02N 2011/0874* (2013.01)

(58) Field of Classification Search
CPC .... F02N 11/087; F02N 11/101; F02N 11/105; F02N 11/0862; F02N 2011/0874; H02K 11/25; H02K 7/14; H02K 23/66; H02K 5/148; H02P 29/60; H02P 1/18; H02H 17/0852
USPC ....................................... 123/179.3
See application file for complete search history.

(56) References Cited

U.S. PATENT DOCUMENTS

| | | |
|---|---|---|
| 3,415,999 A | 12/1968 | Noury |
| 4,668,874 A | 5/1987 | Cresap |

(Continued)

FOREIGN PATENT DOCUMENTS

DE   10 2006 049 529 A1   4/2008

*Primary Examiner* — Mahmoud Gimie
(74) *Attorney, Agent, or Firm* — Briggs & Stratton, LLC

(57) ABSTRACT

A starter motor connected to a power supply and operable to start an internal combustion engine includes an outer housing and a solid state switching device associated with the outer housing. The outer housing encloses a commutator and a series of brushes. The solid state switching device is movable between an open position and a closed position. The current flow from the power supply through the commutator is prevented when the solid state switching device is in the open position.

25 Claims, 14 Drawing Sheets

Related U.S. Application Data

(60) Provisional application No. 62/181,911, filed on Jun. 19, 2015.

(51) Int. Cl.
*F02N 11/10* (2006.01)
*H02H 7/085* (2006.01)

(56) References Cited

U.S. PATENT DOCUMENTS

| | | | |
|---|---|---|---|
| 5,119,466 A * | 6/1992 | Suzuki | H02K 9/22 |
| | | | 310/68 R |
| 5,337,214 A | 8/1994 | Lindsey et al. | |
| 5,742,137 A | 4/1998 | Bratton et al. | |
| 5,848,577 A | 12/1998 | Sappe et al. | |
| 5,907,204 A | 5/1999 | Matsushima et al. | |
| 6,148,781 A | 11/2000 | Boegner et al. | |
| 6,448,676 B1 * | 9/2002 | Kershaw | H02K 5/225 |
| | | | 310/64 |
| 6,456,034 B1 | 9/2002 | Vilou | |
| 6,486,625 B1 | 11/2002 | Vilou | |
| 6,708,429 B1 | 3/2004 | Vilou | |
| 6,864,657 B1 * | 3/2005 | Lungu | H02K 19/103 |
| | | | 318/400.01 |
| 2002/0014216 A1 | 2/2002 | Boegner et al. | |
| 2002/0163197 A1 * | 11/2002 | Koelle | F02N 11/08 |
| | | | 290/38 E |
| 2008/0165457 A1 | 7/2008 | Premerlani et al. | |
| 2010/0186703 A1 | 7/2010 | Heusel et al. | |
| 2012/0139263 A1 * | 6/2012 | Weinum | F02N 11/0851 |
| | | | 290/38 R |
| 2014/0366830 A1 | 12/2014 | Kawano et al. | |

\* cited by examiner

STARTER MOTOR WITH INTEGRATED SOLID STATE SWITCH

CROSS-REFERENCE TO RELATED PATENT APPLICATIONS

This application is a continuation of U.S. application Ser. No. 15/580,122, filed Dec. 6, 2017, which is a U.S. National Stage Application of PCT/US2016/037996, filed Jun. 17, 2016, which claims the benefit of and priority to U.S. Provisional Patent Application No. 62/181,911, filed Jun. 19, 2015, all of which are incorporated herein by reference in their entireties.

BACKGROUND

The present disclosure relates to a starter motor for use with an internal combustion engine. More specifically, the present disclosure relates to a starter motor that includes an integrated solid state switch to initiate operation of the internal combustion engine.

SUMMARY

One embodiment of the present disclosure relates to a starter motor connected to a power supply and operable to start an internal combustion engine. The starter motor includes an outer housing that encloses a commutator and a series of brushes and a solid state switching device associated with the outer housing and movable between an open position and a closed position. The current flow from the power supply through the commutator is prevented when the solid state switching device is in the open position.

Another embodiment of the present disclosure relates to a starter motor connected to a power supply and operable to start an internal combustion engine. The starter motor includes an outer housing that encloses a commutator and a series of brushes and a solid state switching device associated with the outer housing. The solid state switching device is electrically positioned between the power supply and the commutator and is movable between an open position and a closed position. The current flow from the power supply through the commutator is prevented when the solid state switching device is in the open position.

Another embodiment of the present disclosure relates to a starter motor connected to a power supply and operable to start an internal combustion engine. The starter motor includes an outer housing that encloses a commutator and a series of brushes, a solid state switching device associated with the outer housing, and at least one control circuit positioned remotely from the outer housing and connected to the solid state switching device. The solid state switching device is movable between an open position and a closed position based upon activation of a switch element. The current flow from the power supply through the commutator is prevented when the solid state switching device is in the open position. The control circuit is operable to control the operation of the solid state switching device.

The present disclosure relates to a starter motor that includes an integrated solid state switching device that replaces a starter solenoid. The solid state switching device is positioned within the starter motor and can be activated by a control signal to connect the starter motor to ground for low-side switching or to a positive voltage for high-side switching to initiate operation of the starter motor. The solid state switching device positioned within the starter motor or located externally to the starter motor and attached to the starter motor by a wire or mounted on the starter motor by a bolt or similar component can be energized and de-energized by a control command to allow current to flow through the starter motor to initiate operation of an internal combustion engine. The solid state switching device is positioned between the starter motor and ground in a preferred embodiment of the disclosure. In an alternate embodiment of the disclosure, the solid state switching device can be positioned between the battery and the motor. In one embodiment of the disclosure, the solid state switching device includes at least one MOSFET that can be activated by the application of a voltage to the gate of the MOSFET. When the MOSFET is activated, the MOSFET provides a path to ground or the power supply through the starter motor from the battery power supply. The solid state switching device replaces the use of a starter solenoid and thus can be mounted directly within the starter motor.

In one embodiment of the disclosure, the solid state switching device can include one or more of a thermal limiting circuit, a speed sensing circuit, a current limiting circuit or a crank time limiting circuit. The thermal limiting circuit prevents operation of the starter motor when the sensed temperature of the starter motor exceeds a temperature threshold to reduce potential damage to the starter motor due to overheating. The speed sensing circuit prevents operation of the starter motor when the internal combustion engine is running. The speed sensing circuit could also see that the engine is running at a speed and turn off cranking the starter before the user releases the activation switch to stop cranking once the engine starts. The current limiting circuit prevents further operation of the starter motor when the level of current flowing through the starter motor exceeds a high current limit. The crank time limiting circuit limits the amount of time the voltage can be applied to the starter motor and could require the user to deactivate and reactivate in order to try again.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1A:
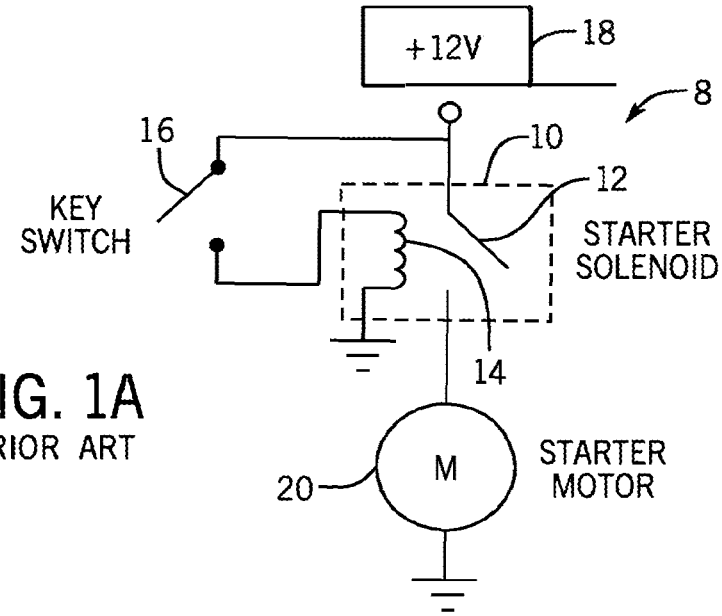
FIG. 1A is a schematic illustration of a prior art starting circuit for a starter motor that includes a starter solenoid.
Figure 1B:
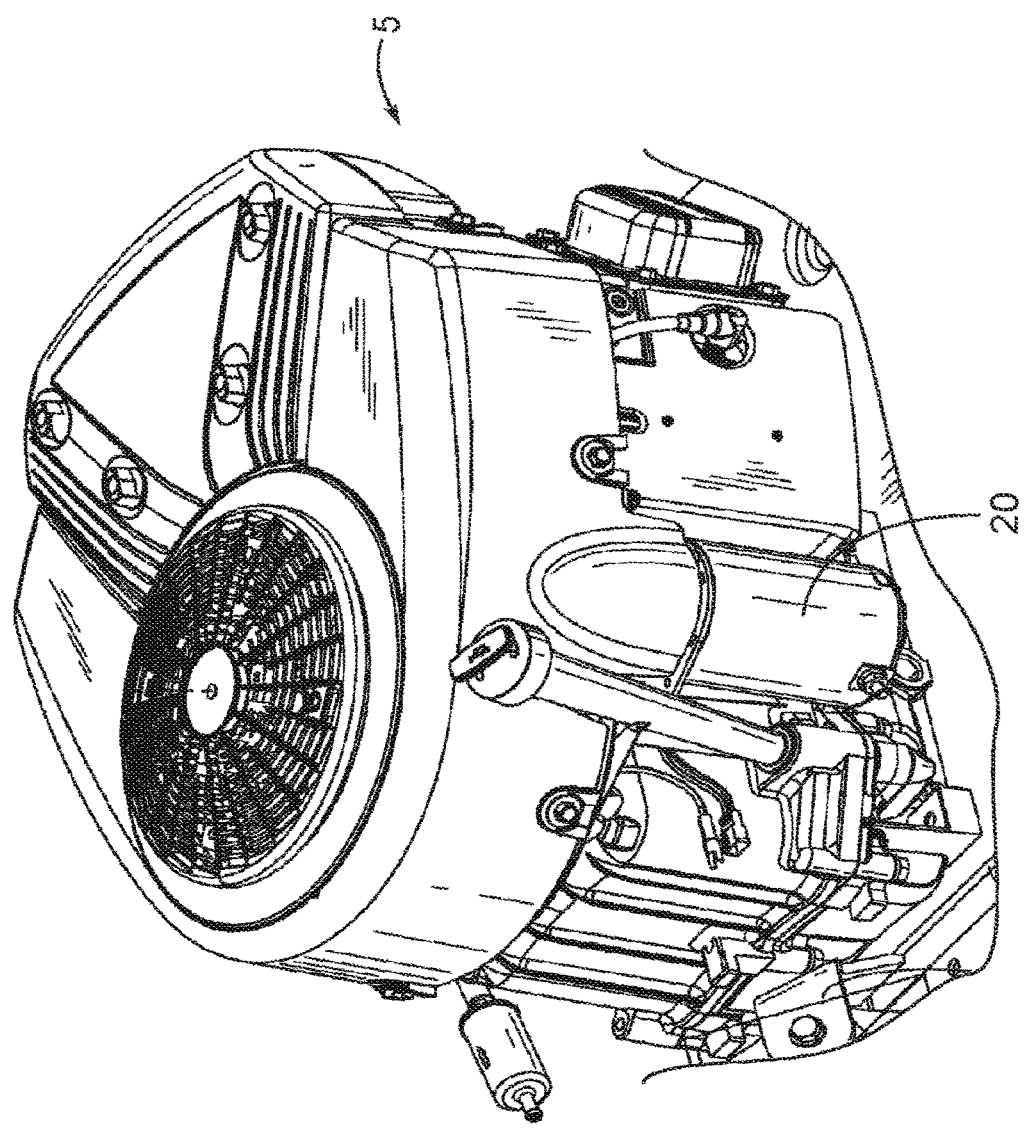
FIG. 1B is an illustration of an internal combustion engine incorporating a starter motor.

A starting circuit 8 is shown in FIG. 1A as including a starter motor 20 is used to initiate operation of an internal combustion engine in many different applications, such as in a riding lawn tractor. These other applications can include other types of engine- or motor-driven equipment, such as other types of tractors, walk behind mowers, zero-turn mowers, power washers, snow blowers and other types of agricultural, forestry, golf, lawn and garden, construction, military, commercial or residential outdoor power equipment and vehicles. FIG. 1B provides an illustrative view of one specific configuration of an internal combustion engine that falls within the scope of the present disclosure. The internal combustion engine 5 is a v-twin engine that includes the starter motor 20.

The starter motor 20 is typically an electric motor driven by a DC power source, such as a 12-volt battery 18. The starter motor 20 is connected to the 12-volt battery 18 through a starter switch, which in FIG. 1A is shown by the starter solenoid 10. The starter solenoid 10 includes a switching element 12 whose position is controlled by an inductive element 14. The flow of current through the inductive element 14 is controlled by a switching element, such as a key switch 16. The key switch 16 could be replaced with other different types of switching elements, such as a push button ignition switch or similar device. When the key switch 16 is closed, current flows from the battery 18 through the inductive element 14, which causes the switching element 12 to close. When the switching element 12 is closed, current flows through the starter solenoid 10 and to the starter motor 20. The switching element 12 is able to handle the relatively high amount of current needed to operate the starter motor 20. A starter solenoid 10 is typically utilized, rather than a simple switching device, due to the amount of current flowing through the switching element. A simple switching device, such as that shown as the key switch 16, would need to be rated for the high level of current, which would greatly increase the cost of the starting circuit and decrease the reliability of the starting circuit. The type of circuit shown in FIG. 1 is commonly used in many different applications.

Although the starting circuit 8 shown in FIG. 1A has proven effective, the starting circuit 8 typically requires the starter solenoid 10 to be mounted near the starter motor 20 somewhere within the engine compartment of the tractor. Typically, the starter solenoid 10 is separately mounted, which can require additional steps as the lawn tractor is being assembled. Additionally, during failure of the starter solenoid 10, the starter solenoid 10 may fail to a closed position in which the switch element 12 is welded into the closed position due to excessive current and overheating. During such a failure, the starter motor 20 continues to operate, which will ultimately result in burning out of the starter motor.

Based upon the shortfalls of the starting circuit 8 shown in FIG. 1A, which includes the starter solenoid 10, the system of the present disclosure presents a new, integrated starting circuit that replaces the starter solenoid IO with a solid state switching device.

Figure 2:
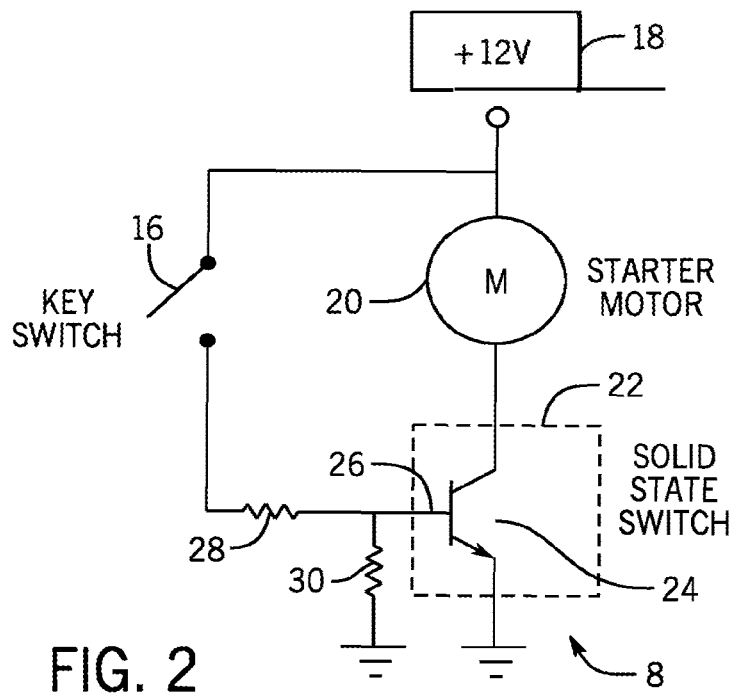
FIG. 2 is a schematic illustration of a starting circuit including a solid state switching device constructed in accordance with the present disclosure.

FIG. 2 illustrates the location of a solid state switching device 22 between the low side of the starter motor 20 and ground. The solid state switching device 22 is shown in FIG. 2 as including a MOSFET 24 that has gate 26 connected to the 12-volt battery 18 through the key switch 16, a current limiting resistor 28 and a pull down resistor 30. When the key switch 16 is moved to its closed position, current flows from the battery 18 through the current limiting resistor 28 to the gate 26 of the MOSFET 24. The voltage applied at the gate 26 closes the solid state MOSFET switch, which allows current to flow through the starter motor 20 to the ground connection. In this manner, the solid state switching device 22 is positioned between the low side of the starter motor rather than on the high side of the starter motor, as shown in the prior art embodiment of FIG. 1.

In the embodiment shown in FIG. 2, the MOSFET 24 is an N-channel MOSFET that could be replaced by various different types of solid state switching devices, such as a P-channel MOSFET, a silicon controlled rectifier (SCR), a transistor or any other type of solid state switch that can be switched utilizing the application of a voltage or current. In addition, the analog sensing and crank limiter discrete components could also be simplified by switching to a microcontroller design.

Although the embodiment shown in FIG. 2 includes the solid state switching element 22 on the low side of the starter motor 20, it is contemplated that the solid state switching device 22 could be moved to the high side of the starter motor and thus be positioned between the battery 18 and the starter motor. However, in such an embodiment, the solid state switching device would require a different type of MOSFET, which would increase the cost of the starting circuit 8.

Figure 3:
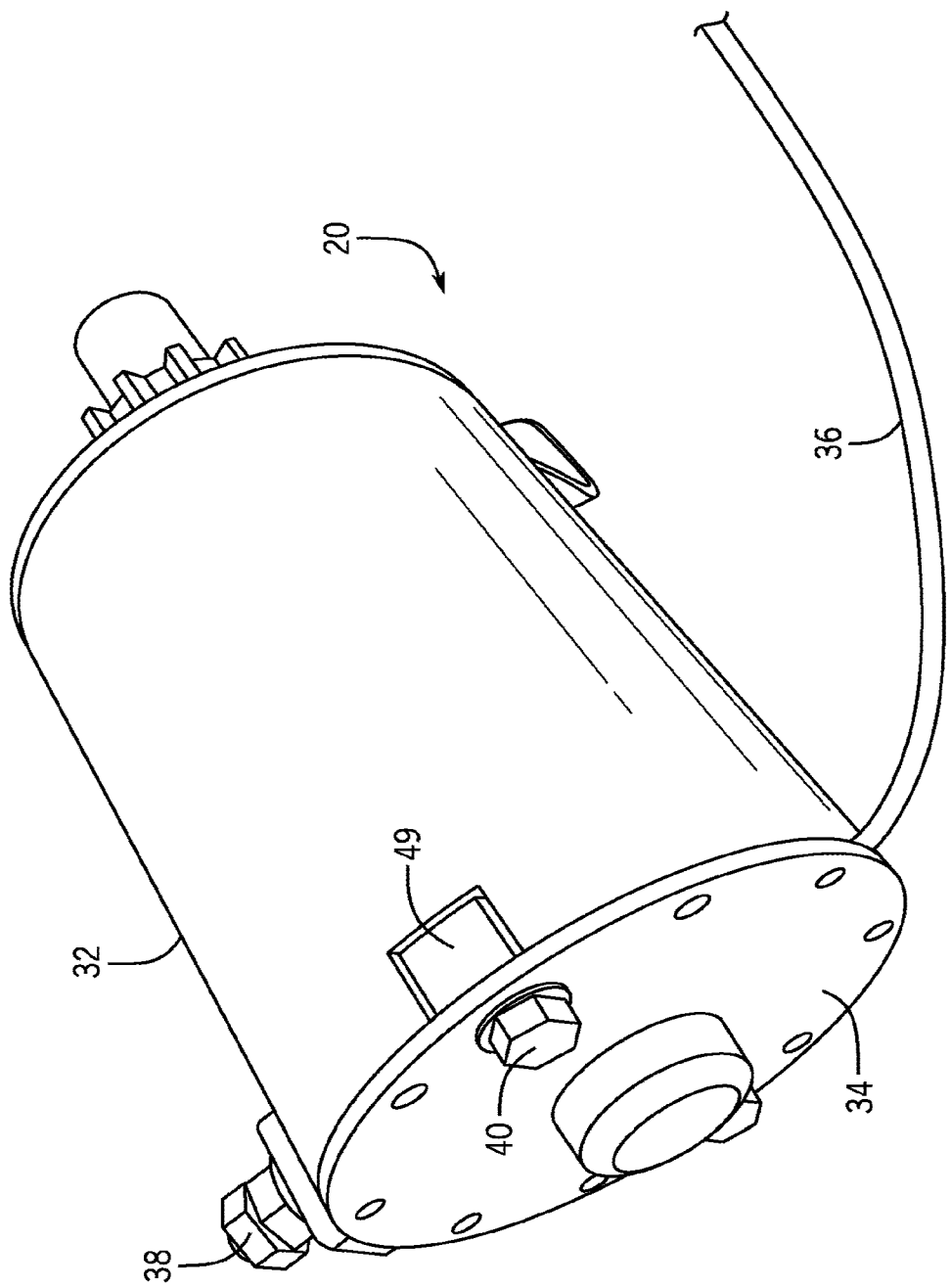
FIG. 3 is a perspective view of an integrated starter motor including the solid state switching device of the present disclosure.
Figure 4:
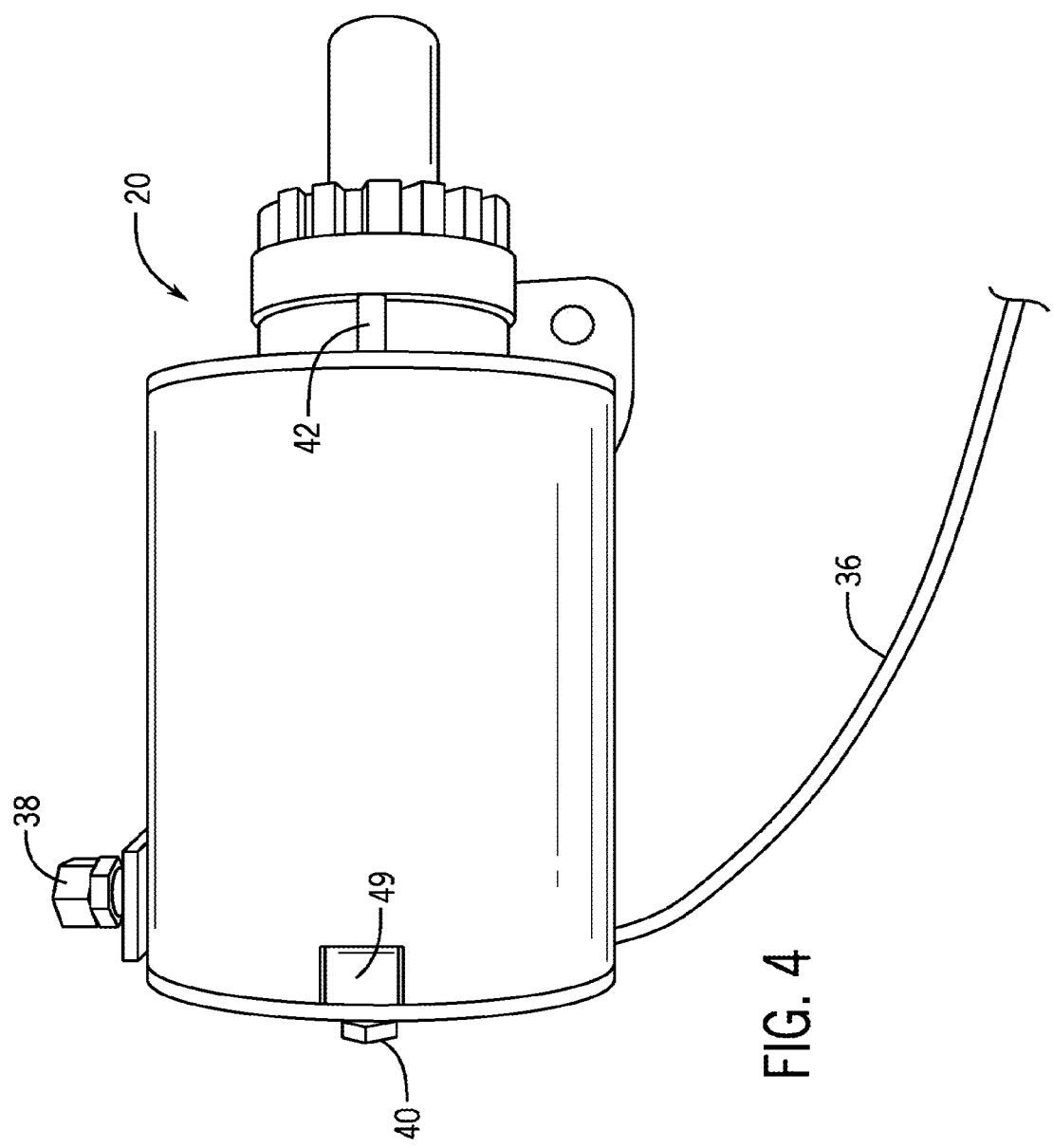
FIG. 4 is a top view similar to FIG. 3.

FIGS. 3 and 4 illustrate a starter motor 20 with the starting circuit contained within the outer housing 32. As shown in FIG. 3, the outer housing 32 includes a metallic backing plate 34. A control wire 36 enters into the outer housing 32 to control operation of the solid state switching device. The starter motor 20 includes a screw lug 38 that receives a connection from the battery. The metallic backing plate 34 is held in place by a screw 40 which passes through the starter motor and exits with a screw end 42 shown in FIG. 4. In the embodiment shown in FIGS. 3 and 4, the solid state starting circuit is integrated into the starter motor such that no other components are required to be mounted anywhere within the engine compartment. The starter motor starting circuit is controlled by a signal applied through the control wire 36.

Figure 5:
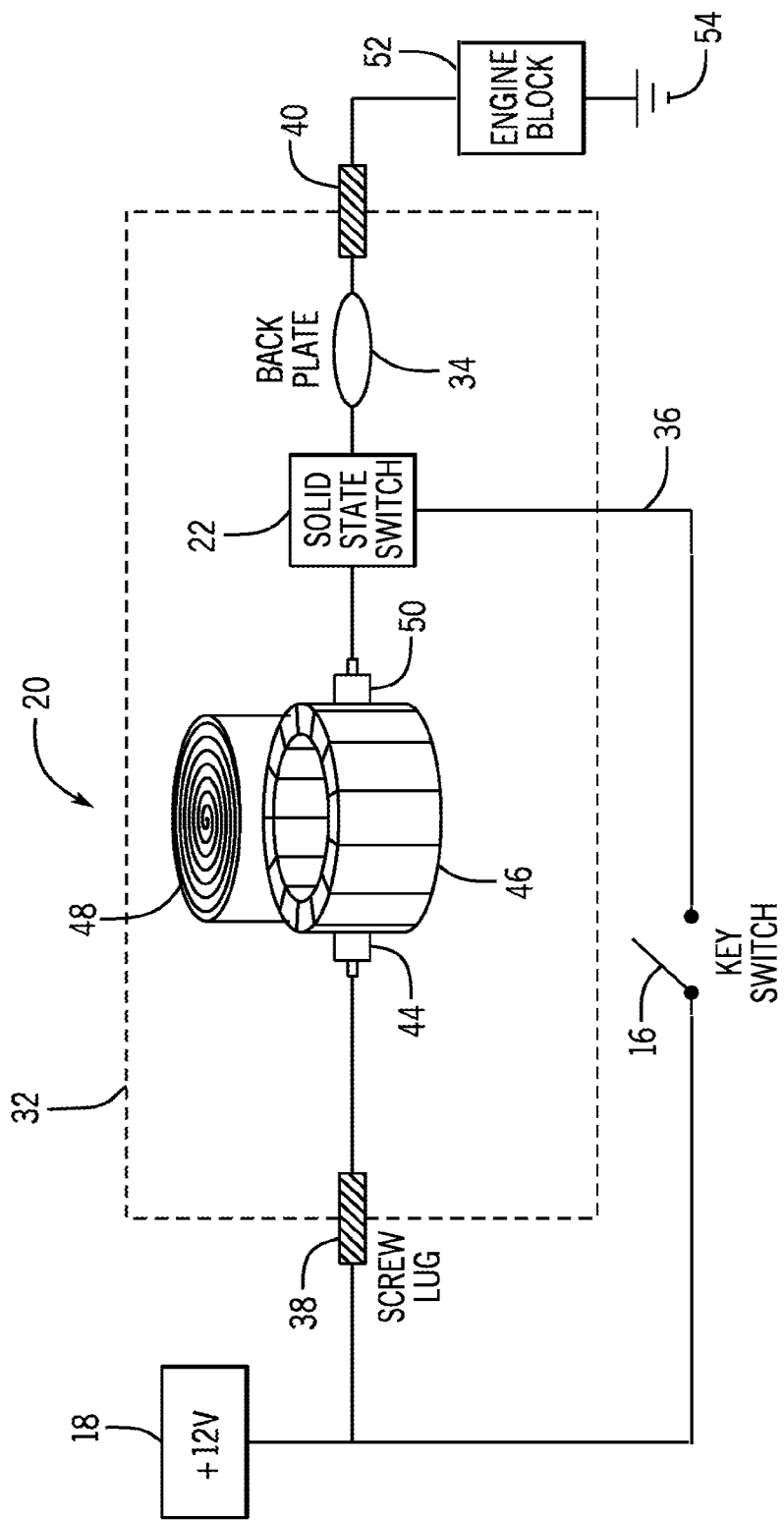
FIG. 5 is an electrical schematic illustration showing the electrical connections that form the starting circuit of the present disclosure.

FIG. 5 illustrates a schematic representation of the electrical connections within the starter motor 20. As shown in FIG. 5, the 12-volt battery 18 has its high side connected to the screw lug 38 that extends through the outer housing 32 of the starter motor 20. The screw lug 38 extends through the outer housing 32 of the starter motor and has its opposite end in electrical connection with one of the brushes 44 of the starter motor. The starter motor includes a commutator 46 that includes a series of individual elements, as is well known. The commutator elements that are 180° apart from each other are connected by a series of windings 48 in a well-known manner. Depending on the design of the starter motor, the commutator elements could be separated by different angles, such as 90°.

The opposite brush 50 is connected to the solid state switching device 22 of the present disclosure. As indicated, the solid state switching device 22 is positioned on the low side of the commutator and is generally positioned between the brush 50 and a ground connection. As discussed previously, the solid state switching device 22 could be moved to the high side and be positioned between the screw lug 38 and the brush 44. However, positioning the solid state switching device 22 on the low side reduces the cost of the components, such as the MOSFET that forms the solid state switch. The solid state switching device 22 is positioned within the housing 32 and receives an activating voltage upon closing of the key switch 16, as described in FIG. 2.

Referring back to FIG. 5, the opposite side of the solid state switching device 22 is connected to the back plate 34 of the housing 32, which in turn is connected to the screw 40 through the metallic lug 49 shown in FIG. 3. The screw 40 passes through the entire housing and is electrically connected to the engine block 52, which is in turn connected to the negative terminal of the battery and ultimately to ground 54. In an alternate embodiment, the back plate 34 could be connected to the engine block 52 through a cable or wire. In another contemplated embodiment, the low side of the solid state switching device 22 could be connected to ground using a wire or some other type of conductive element. The back plate 34 shown in FIG. 5 is one convenient type of connection to ground within the housing 32. In addition to acting as a connection to ground, the back plate 34 acts as a heat sink to dissipate heat generated by the solid state switching device 22. Other structural parts of the starter motor could also be physically connected to the solid state switching device 22 to function as a heat sink.

Figure 6:
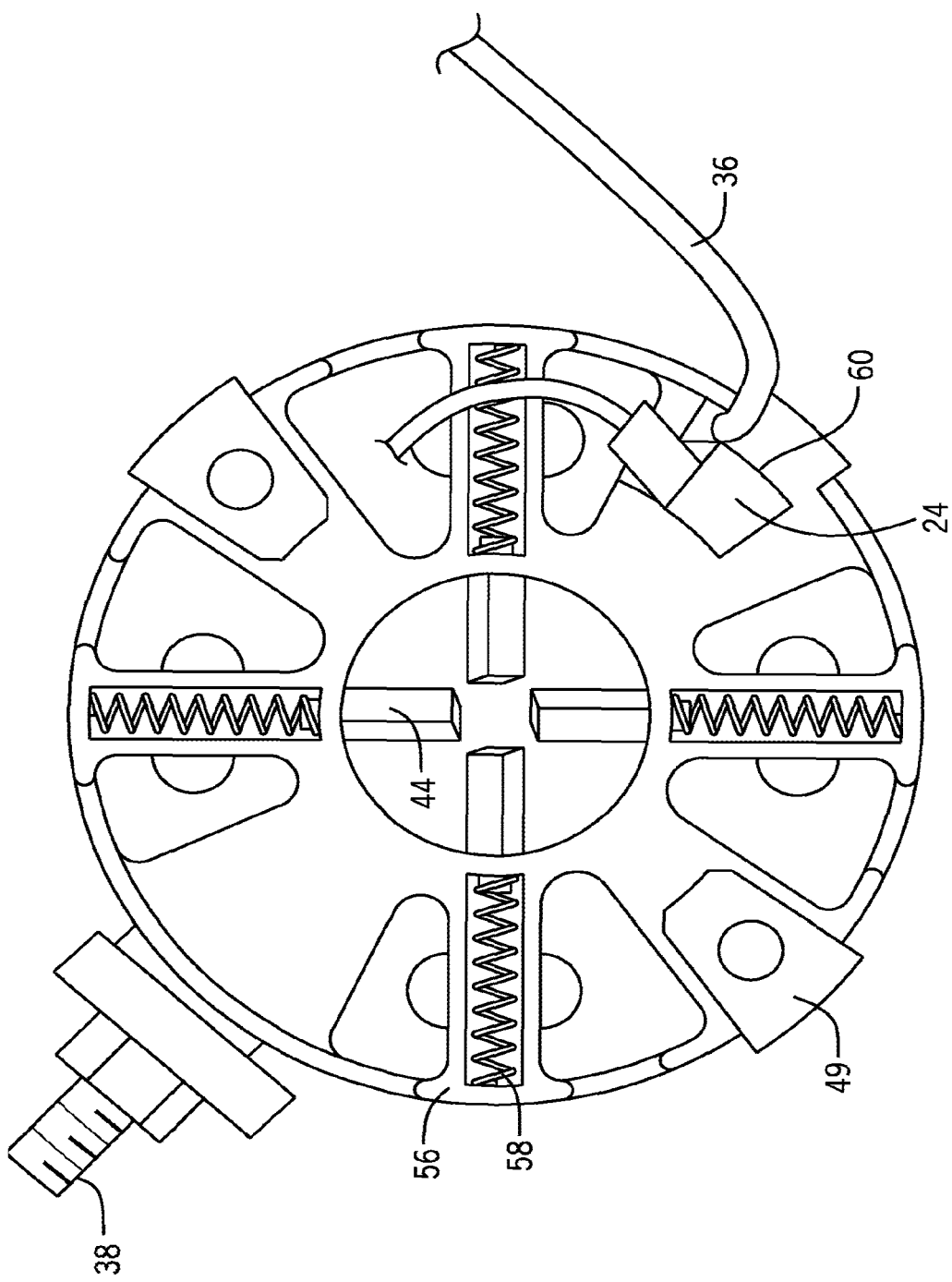
FIG. 6 is a view of a brush holder of the starter motor including the solid state switching device.

FIG. 6 illustrates one embodiment of the internal mounting of the solid state switch 22 within the starter motor. As shown in FIG. 6, the screw lug 38 is formed as part of an internal brush holder 56. The brush holder 56 is formed from a molded plastic and includes a plurality of bias springs 58 that urge each of the brushes 44 into contact with the commutator (not shown). In FIG. 6, a MOSFET 24 is positioned within an internal cavity 60 that is formed as part of the holder 56. The control wire 36 communicates with the MOSFET 24 and controls the opening and closing of the solid state switch. As can be understood in the embodiment of FIG. 6, the entire solid state switching device, and specifically the MOSFET 24, is mounted within the holder 56 and thus within the outer housing of the starter motor.

Figure 7:
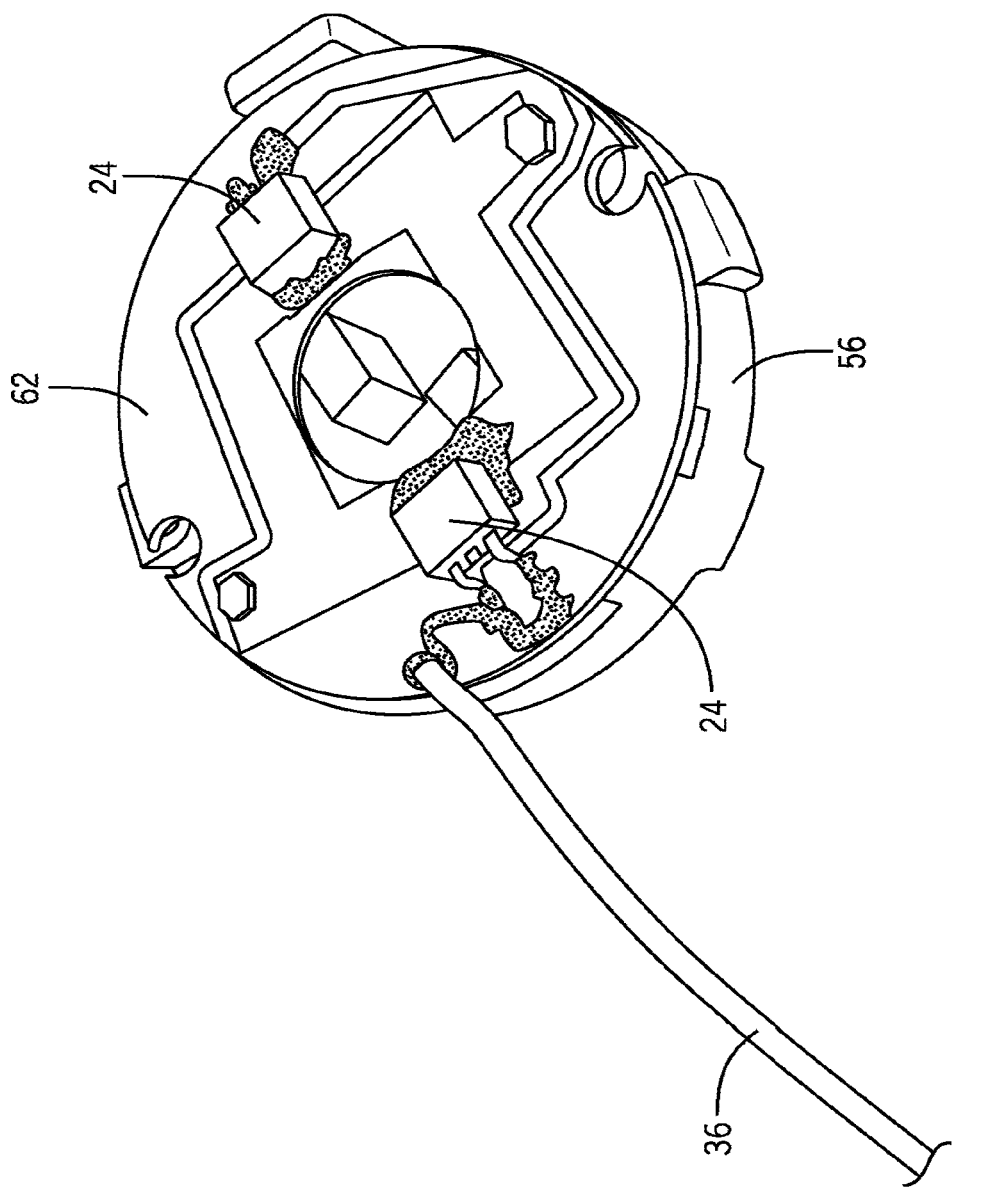
FIG. 7 is an alternate illustration of the solid state switching device.

FIG. 7 illustrates another alternate embodiment used to mount the solid state switching device within the starter motor. In the embodiment shown in FIG. 7, a mounting board 62 is connected to the brush holder 56 and is used to mount a pair of MOSFETS 24. A pair of MOSFETS 24 are utilized to handle a higher amount of current. However, it should be understood that a single MOSFET 24 could be utilized while operating within the scope of the present disclosure.

In the embodiment shown in FIG. 7, the mounting board 62 includes a significant amount of real estate, which would allow additional operating components and control components to be mounted within the outer housing of the starter motor. As will be discussed below, the additional circuitry that could be mounted to the mounting board 62 would allow for additional operating control of the starter motor.

FIGS. 8-13 illustrate various different configurations for the solid state switching device constructed in accordance with the present disclosure. Each of these embodiments could be used within the outer housing of the starter motor.

Figure 8:
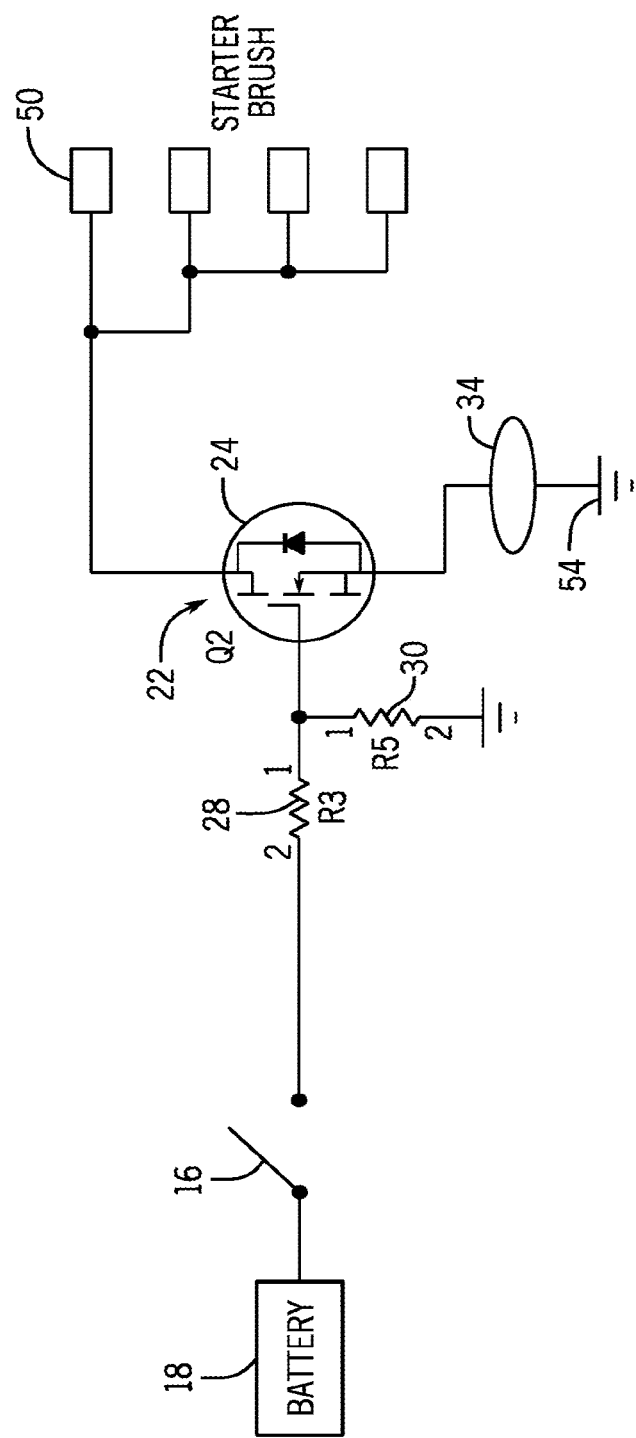
FIG. 8 is a circuit schematic illustrating the position of the solid state switching device on the low side of the motor.

FIG. 8 illustrates a solid state switching device 22 that includes the MOSFET 24 positioned between the grounded back plate ground 34 and the individual starter brushes 50. As was discussed in FIG. 2, the current limiting resistor 28 and the pull down resistor 30 are positioned between the key switch 16 and the gate of the MOSFET 24.

Figure 9:
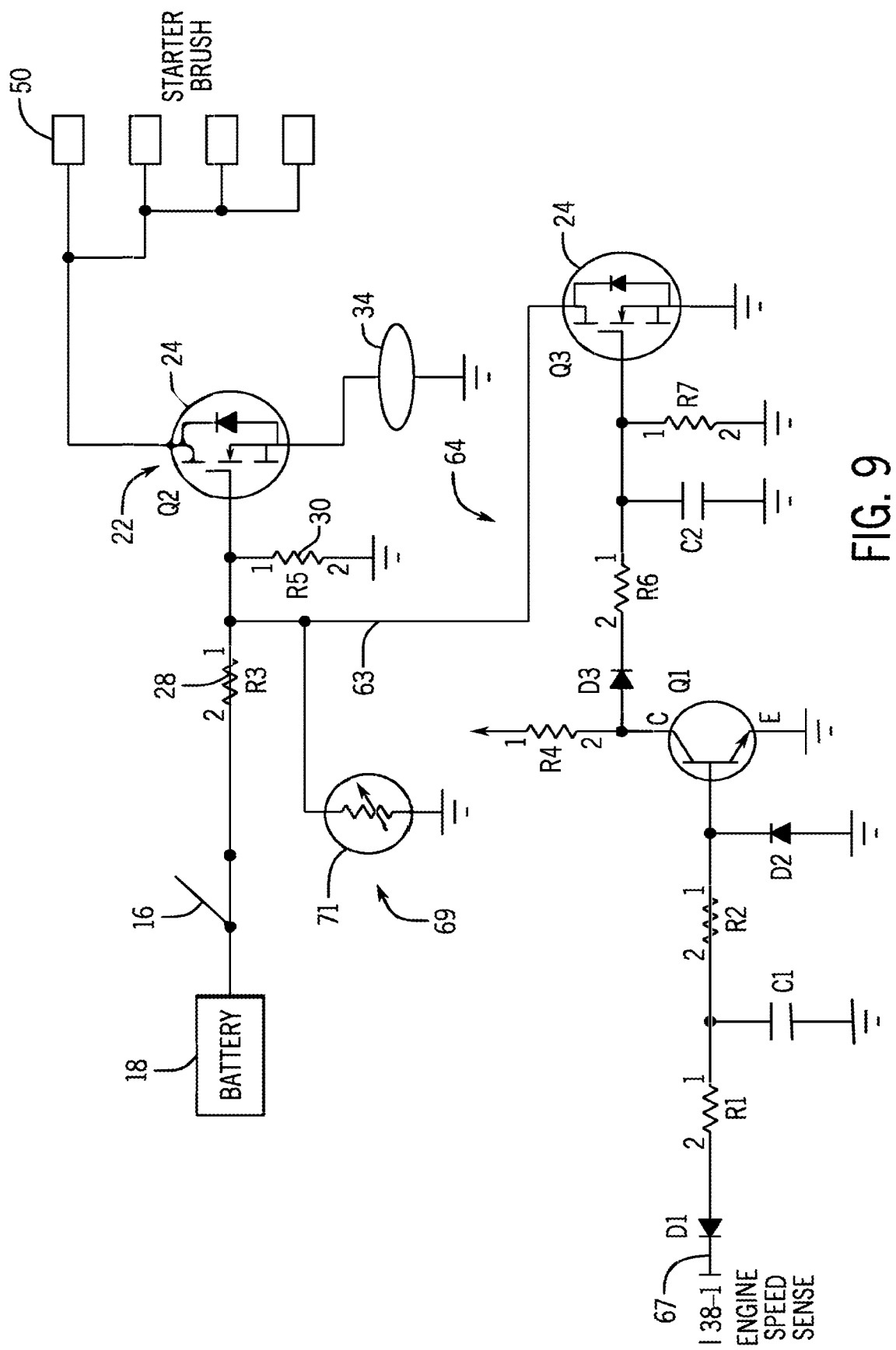
FIG. 9 is a circuit schematic similar to FIG. 8 showing the inclusion of a speed sensing circuit.

FIG. 9 illustrates an enhanced solid state switching device 22 that includes the same MOSFET 24. The solid state switching device 22 is again located on the low side of the starter motor as in the embodiment of FIG. 8. However, in the embodiment of FIG. 9, the system includes a speed sensing circuit 64. The speed sensing circuit 64 will ground the gate of the MOSFET 24 through a control line 63 and a second MOSFET 65 to prevent activation of the starter motor 20 should the circuit sense that the engine is already in operation or while cranking and the speed of the engine gets to a predetermined "running" speed, indicating that the engine is running. The speed sensing circuit is connected to an engine speed sensing pin 67. Based on the signal on the engine speed sensing pin 67, the gate of the MOSFET 65 will be pulled high to activate the MOSFET 65, and thus ground the gate of the MOSFET 24. When the gate of the MOSFET 24 is grounded, current will not flow through the starter motor 20, as shown and described with reference to FIG. 2.

In the embodiment shown in FIG. 9, the system is also shown including a thermal limiting circuit 69 which grounds the gate of the MOSFET 24 when a sensed temperature exceeds a threshold temperature. The sensed temperature is a temperature that is related to the starter motor. This sensed temperature could be the temperature of the solid state switching device, the temperature of the air within the outer housing, the temperature of the air close to the outer housing or the temperature of any component of the starter motor or any component within or nearby the starter motor. In the embodiment shown, the thermal limiting circuit 69 includes a thermistor 71 that is positioned in parallel with the resistor 30. The resistive value of the thermistor 71 changes based upon temperature and thus changes the voltage applied to the gate of the MOSFET 24. When the voltage at the gate falls below an activation voltage, the MOSFET 24 turns off and thus prevents activation of the starter motor. Although a thermistor is shown in the embodiment of FIG. 9, other types of circuits/components are contemplated as being able to function as the thermal limiting circuit 69. As an example, a normally open or normally closed temperature controlled switch could be connected to the gate of the MOSFET 24 or a thermal comparator including a thermistor could be connected to the gate of the MOSFET 24. In each contemplated embodiment, the thermal limiting circuit would prevent operation of the starter motor when the temperature of the starter motor exceeds a threshold value.

Figure 10:
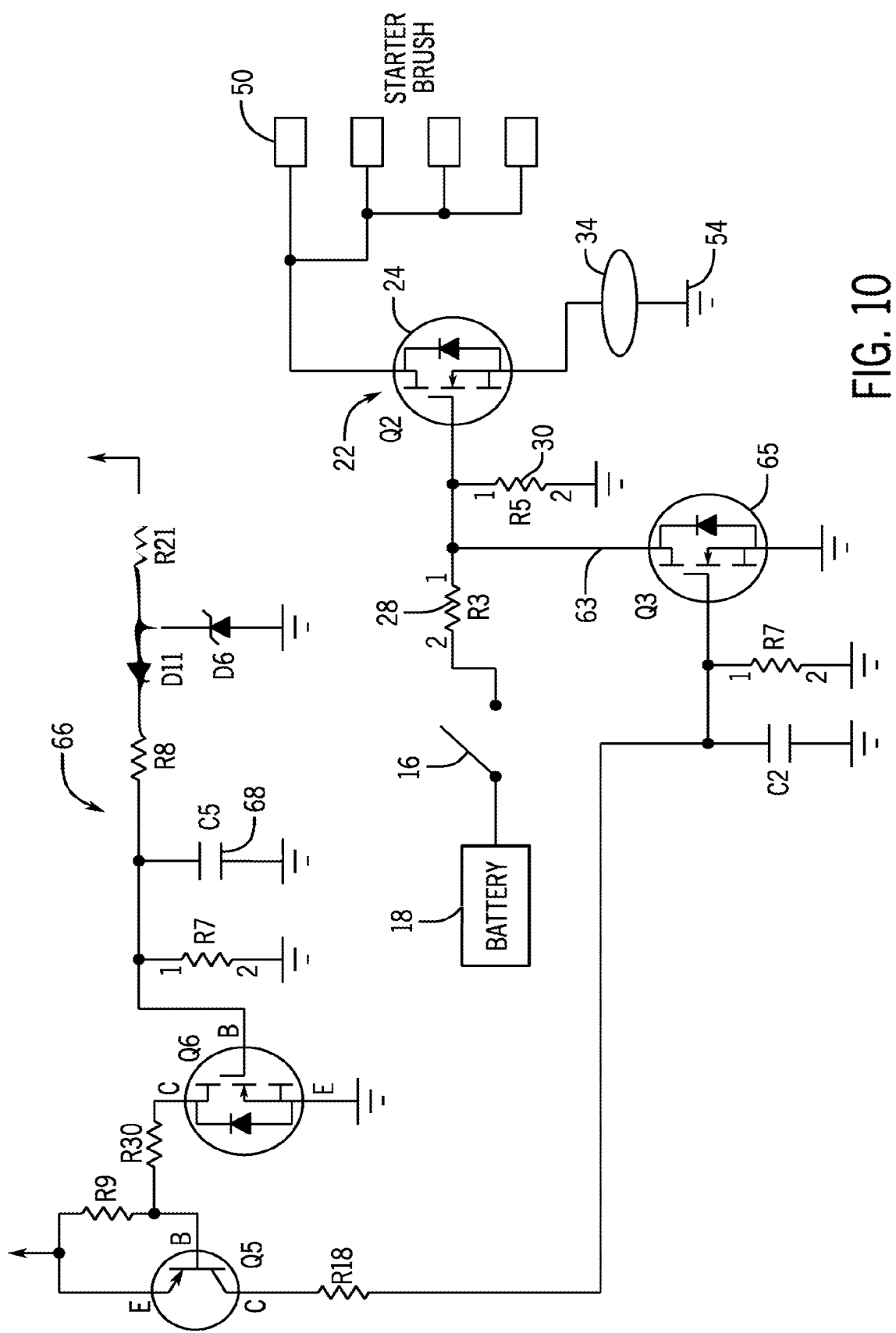
FIG. 10 is a circuit schematic similar to FIG. 8 including a crank limiting circuit.

FIG. 10 is another enhancement to the starting circuit shown in FIG. 8. In the embodiment shown in FIG. 10, the MOSFET 24 is again connected on the low side of the starter motor. However, in the embodiment illustrated, the starting circuit includes a crank time limiting circuit 66 which again grounds the gate of the MOSFET 24 through a control line 63 and a second MOSFET 65 to terminate cranking after a set time period. The time period is controlled by a capacitor 68. If the starter crank signal is applied to the MOSFET 24 for greater than a set time period, the crank time limiting circuit 66 grounds the gate of the MOSFET 24, which prevents additional cranking of the internal combustion engine and requires reactivation to again attempt to crank the engine.

Figure 11:
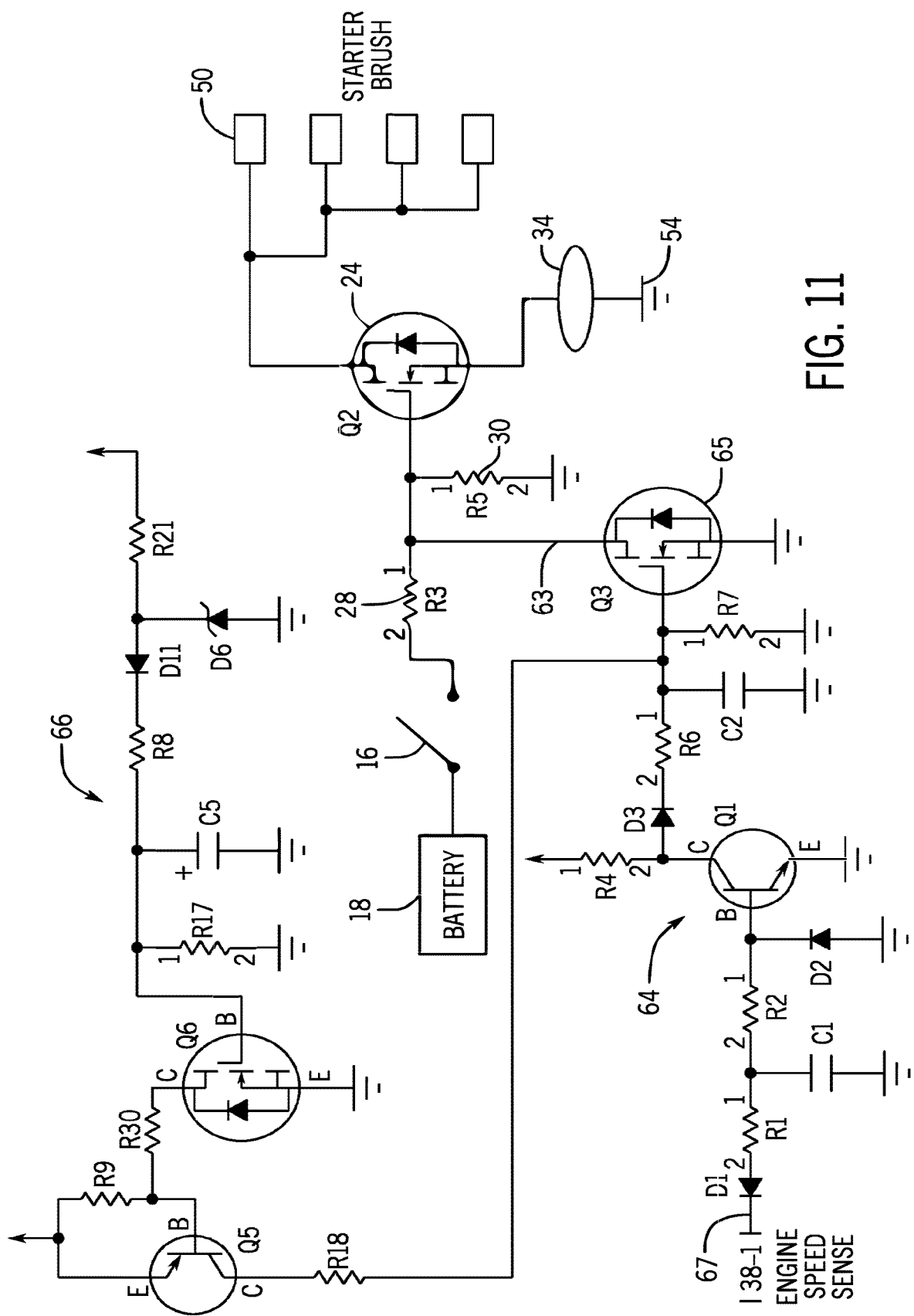
FIG. 11 is a circuit schematic similar to FIG. 8 showing the inclusion of both a speed sensing circuit and a crank limiting circuit.

FIG. 11 presents an embodiment that includes both the speed sensing circuit 64 and the crank time limiting circuit 66. Once again, the entire solid state switching device is located on the low side of the starter motor. In addition, the schematic of FIG. 11 could include a thermal limiting circuit or the schematic of FIG. 11 could include any combination of these three circuit options.

Although the present disclosure provides three illustrative examples of the types of circuits that could be used in accordance with the present disclosure, it should be noted that various different types of sensing circuits could be utilized while operating within the scope of the present disclosure.

Figure 12:
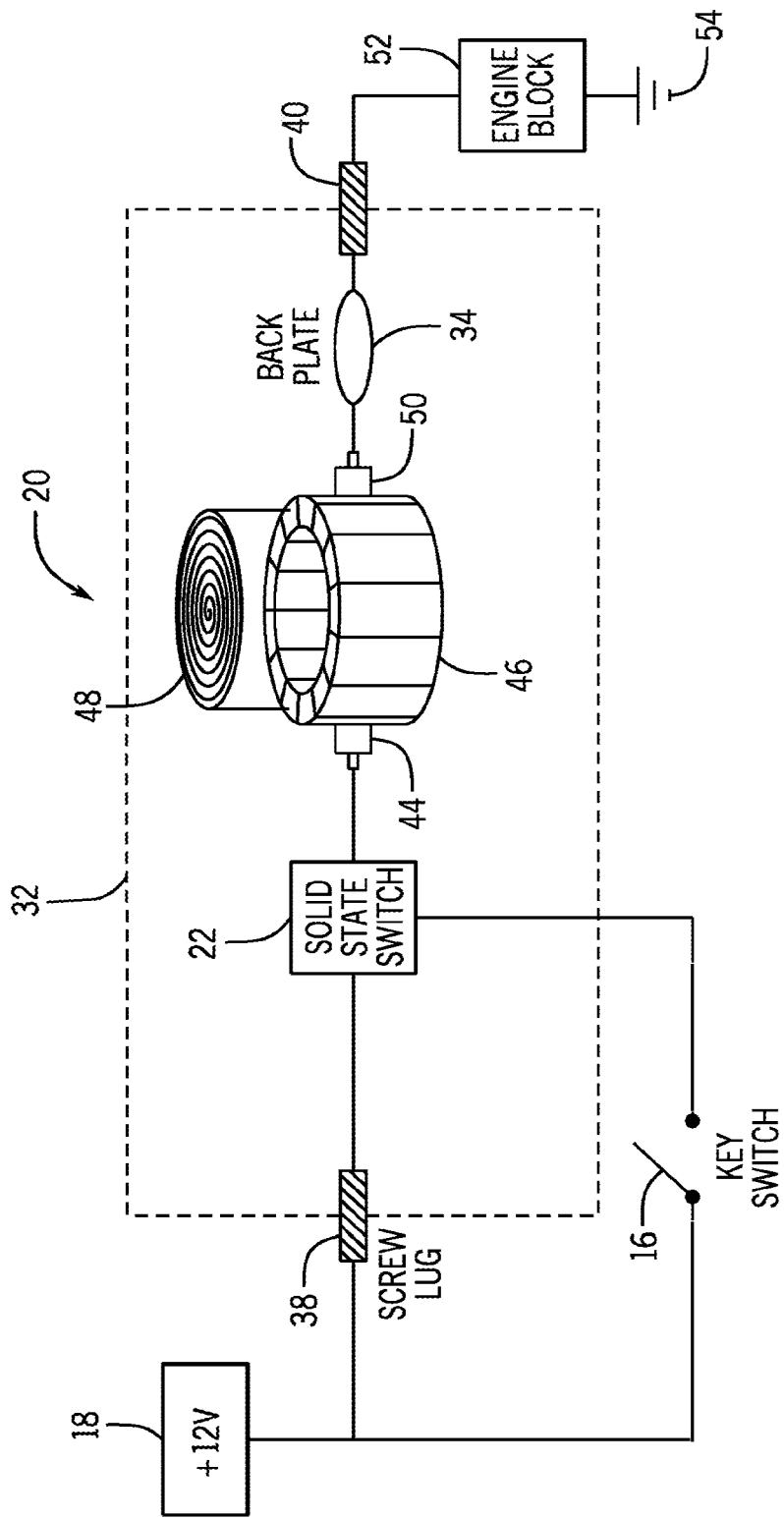
FIG. 12 is an electrical schematic illustration showing the electrical connections that for the starting circuit when incorporated on the high side of the starting motor.

FIG. 12 illustrates a starting circuit that is located on the high side of the starter motor. As shown in FIG. 12, the 12-volt battery 18 has its high side connected to the screw lug 38 that extends through the outer housing 32 of the starter motor 20. The screw lug 38 extends through the outer housing of the starter motor and has its opposite end in electrical connection with the solid state switching device 22. The solid state switching device 22 receives an activating current upon closing of the key switch 16, as was described previously. When the solid state switching device 22 is activated, the current from the battery 18 passes through the solid state switching device 22. The opposite side of the solid state switching device 22 is connected to one of the brushes 44 of the commutator 46 included in the starter motor. The commutator elements that are 180° apart from each other are connected by a series of windings 48 in a well-known manner.

The opposite brush 50 is connected to the back plate 34 of the starter motor, which in turn is connected to the screw 40 through the metallic lug 49 shown in FIG. 3. The screw 40 passes through the entire housing and is electrically connected to the engine block 52, which is in turn connected to the negative terminal of the battery and ultimately to ground 54. In an alternate embodiment, the back plate 34 could be connected to the engine block 52 through a cable or wire. Although the solid state switching device 22 is not shown connected to the back plate 34, as was the case when the solid state switching device 22 is positioned on the low side of the commutator, the solid state switching device 22 could be physically connected to the back plate 34 or other structural parts of the starter motor. Such a physical connection would allow the structural parts of the starter motor to act as a heat sink to dissipate heat generated by the solid state switching device 22.

Figure 13:
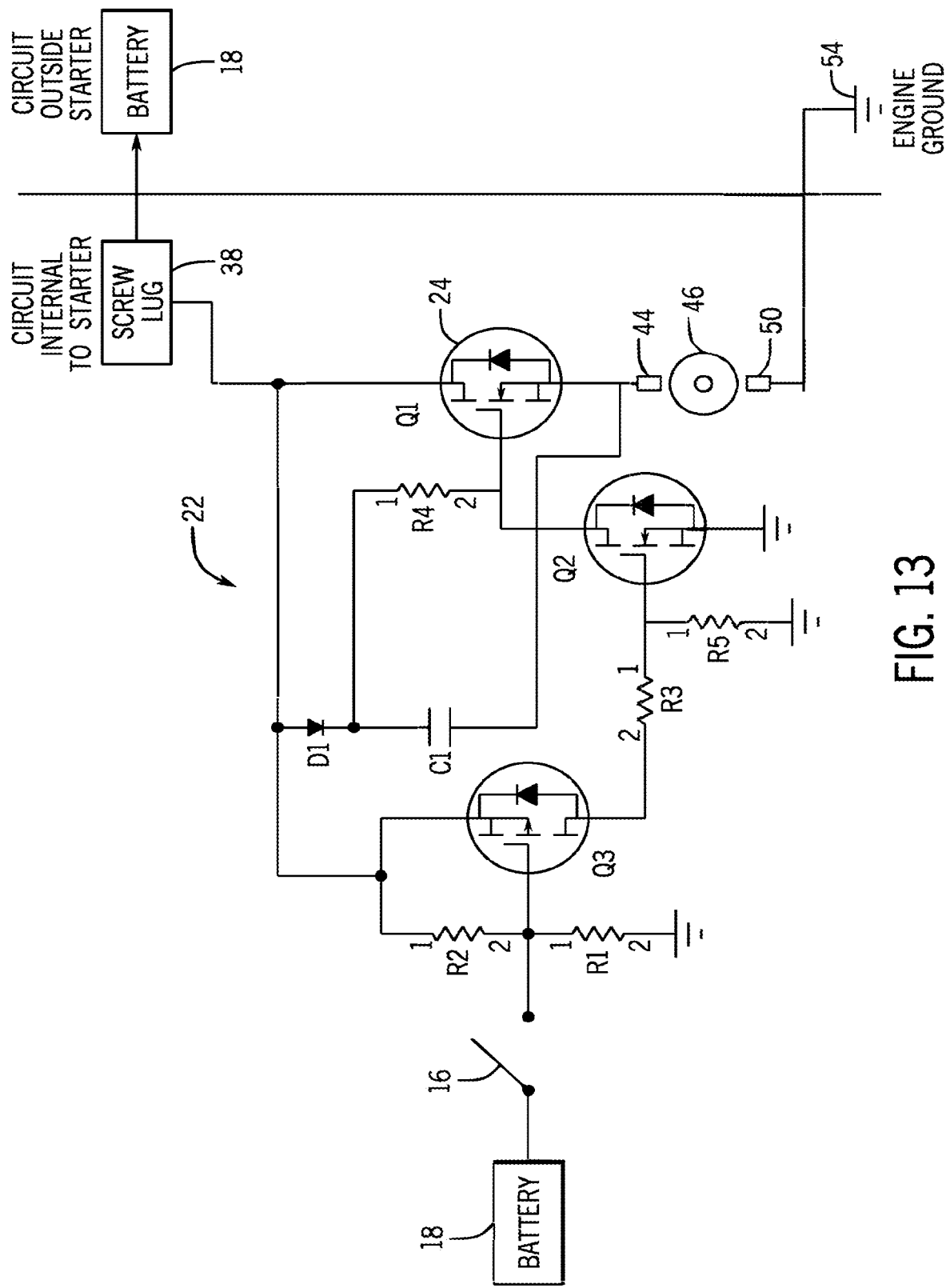
FIG. 13 is a circuit schematic showing the location of the solid state switching device on the high side of the starter motor.

FIG. 13 is a first implementation of the starting circuit generally shown in FIG. 12. As illustrated, the starting circuit includes MOSFET 24 that is positioned between the screw lug 38 and the starter brush 44. The starter crank signal from the key switch 16 is supplied to the MOSFET 24 to control closing of the MOSFET 24.

Figure 14:
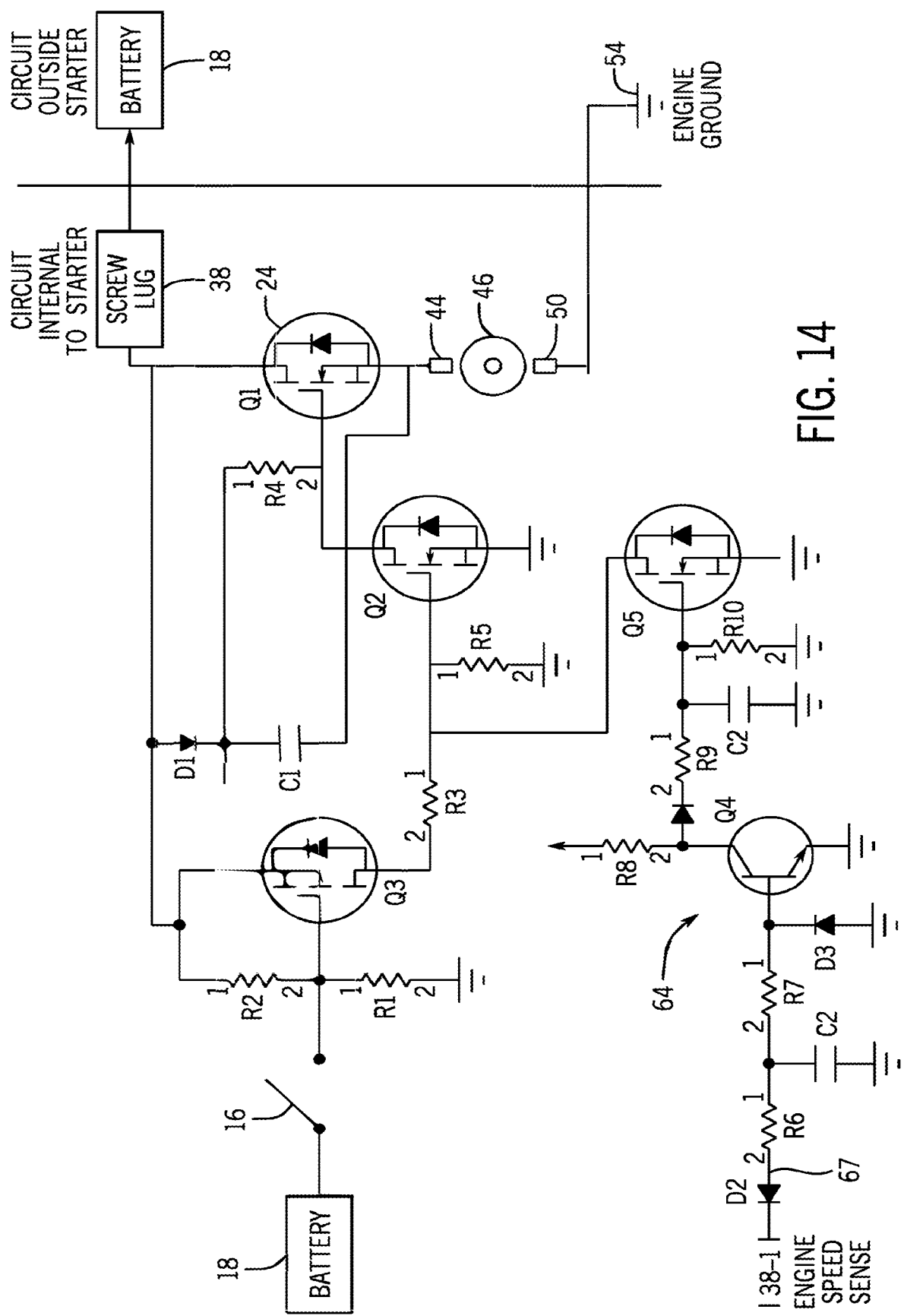
FIG. 14 is a circuit schematic similar to FIG. 13 with the inclusion of a speed sensing circuit.

FIG. 14 is a starting circuit similar to that shown in FIG. 13 with the addition of the speed sensing circuit 64. As discussed previously, the speed sensing circuit 64 prevents cranking of the internal combustion engine when the engine is already in operation. Although not shown, the circuit of FIG. 13 could also include a crank time limiting circuit and/or a thermal limiting circuit, or any combination of these three circuit options. The combination of sensing circuits described above could be utilized in order to prevent cranking of the internal combustion engine through operation of the starter motor upon various different sensed conditions. In each embodiment, when the sensed condition or value exceeds a threshold, such as a temperature threshold in the case of a thermal limiting circuit, the thermal limiting circuit will prevent the application of the voltage from the battery 18 to the starter motor.

As discussed in FIGS. 3-5, the solid state switch 22, and specifically the MOSFET included as part of the solid state switch, is connected to the metallic back plate 34. The metallic back plate is able to dissipate heat generated by the MOSFET and thus acts as a heat sink. It is contemplated that additional fins could be incorporated into the back plate to further enhance heat transfer.

As also described with reference to FIG. 7, the mounting board 62 could hold a significant number of other types of operating circuits. As an illustrative example, the circuit board could include a MEMS sensor that is used to sense vibration of the internal combustion engine. Additionally, the circuit board could include an RF transceiver that would allow starting of the internal combustion engine utilizing an RF signal, such as from a remote control or even a smart phone application software. Since the entire operating and control circuitry would be included within the starter motor, only the starter motor would need to be mounted within the tractor and would require no additional connections other than the control wire 36.

In each embodiment of the disclosure shown and described above, the solid state switching device is designed to be located within the outer housing of the starter motor. The solid state switching device is connected to a control wire 36 that enters into the outer housing to control the operation of the solid state switching device. Although this type of configuration is preferred for the reasons set forth above, it is contemplated that the solid state switching device could be an external component that attaches to the outer housing 32 and receives the control wire. As one contemplated embodiment, the solid state switching device could bolt onto the positive voltage terminal and receive the control wire. In this embodiment, the solid state switching device would provide switching on the high side of the starter motor such as in the embodiments shown in FIGS. 12-14. Although the external bolt-on concept is described as being utilized with the high side of the starter motor, it should be noted that the same type of module could be used on the low side while operating within the scope of the present disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A starter motor connected to a power supply and operable to start an internal combustion engine, comprising:
   an outer housing that encloses a commutator and a series of brushes;
   a solid state switching device associated with the outer housing and movable between an open position and a closed position; and a speed sensing circuit for controlling of the solid state switching device in response to a sensed engine speed;

wherein current flow from the power supply through the commutator is prevented when the solid state switching device is in the open position and is allowed when the solid state switching device is in the closed position, wherein the starter motor is operated to start the internal combustion engine when the solid state switching device is in the closed position, and wherein the speed sensing circuit causes the solid state switching device to move to the open position in response to the sensed engine speed being a predetermined running speed that indicates the internal combustion engine is running.

2. The starter motor of claim 1, wherein the solid state switching device includes a MOSFET.

3. The starter motor of claim 1, wherein the solid state switching device is electrically positioned between the commutator and ground.

4. The starter motor of claim 1, wherein the outer housing includes a back plate connected to ground, wherein the solid state switching device is electrically connected between one of the series of brushes and the back plate.

5. The starter motor of claim 1, further comprising a brush holder positioned within the outer housing to support the series of brushes relative to the commutator, wherein the solid state switching device is mounted to the brush holder.

6. The starter motor of claim 1, further comprising at least one control circuit positioned remotely from the outer housing and connected to the solid state switching device, wherein the at least one control circuit is operable to control the operation of the solid state switching device.

7. The starter motor of claim 6, wherein the at least one control circuit is a crank time limiting circuit that moves the solid state switching device to the open position based upon the duration of activation of the starter motor.

8. The starter motor of claim 6, wherein the at least one control circuit is a thermal limiting circuit that moves the solid state switching device to the open position based upon the temperature of the starter motor or the temperature of the solid state switching device.

9. The starter motor of claim 6, wherein the at least one control circuit is a current limiting circuit that moves the solid state switching device to the open position based on the amount of current flowing through the starter motor.

10. The starter motor of claim 1, wherein the solid state switching device is connected to an ignition switch associated with the internal combustion engine, wherein the ignition switch is connected to the power supply and is moveable between a switch open position and a switch closed position such that when the ignition switch is in the switch closed position an activation voltage can be supplied from the power supply to the solid state switching device through the ignition switch, and wherein the solid state switching device only moves to the closed position when the activation voltage is supplied to the solid state switching device.

11. The starter motor of claim 1, wherein the solid state switching device is physically connected to the starter motor such that the starter motor dissipates heat generated by the solid state switching device.

12. A starter motor connected to a power supply and operable to start an internal combustion engine, comprising:
an outer housing that encloses a commutator and a series of brushes;
a solid state switching device associated with the outer housing and electrically positioned between the power supply and the commutator and movable between an open position and a closed position; and
a speed sensing circuit for controlling of the solid state switching device in response to a sensed engine speed;
wherein current flow from the power supply through the commutator is prevented when the solid state switching device is in the open position and is allowed when the solid state switching device is in the closed position, wherein the starter motor is operated to start the internal combustion engine when the solid state switching device is in the closed position, and wherein the speed sensing circuit causes the solid state switching device to move to the open position in response to the sensed engine speed being a predetermined running speed that indicates the internal combustion engine is running.

13. The starter motor of claim 12, wherein the solid state switching device includes at least one MOSFET.

14. The starter motor of claim 12, further comprising at least one control circuit positioned remotely from the outer housing and connected to the solid state switching device, wherein the control circuit is operable to control the operation of the solid state switching device.

15. The starter motor of claim 14, wherein the at least one control circuit is a crank time limiting circuit that moves the solid state switching device to the open position based upon the duration of activation of the starter motor.

16. The starter motor of claim 14, wherein the at least one control circuit is a current limiting circuit that moves the solid state switching device to the open position based on the amount of current flowing through the starter motor.

17. The starter motor of claim 12, wherein the solid state switching device is connected to an ignition switch associated with the internal combustion engine, wherein the ignition switch is connected to the power supply and is moveable between a switch open position and a switch closed position such that when the ignition switch is in the switch closed position an activation voltage can be supplied from the power supply to the solid state switching device through the ignition switch, and wherein the solid state switching device only moves to the closed position when the activation voltage is supplied to the solid state switching device.

18. A starter motor connected to a power supply and operable to start an internal combustion engine, comprising:
an outer housing that encloses a commutator and a series of brushes;
a solid state switching device associated with the outer housing,
wherein the solid state switching device is movable between an open position and a closed position based upon activation of a switch element, wherein current flow from the power supply through the commutator is prevented when the solid state switching device is in the open position and is allowed when the solid state switching device is in the closed position, and wherein the starter motor is operated to start the internal combustion engine when the solid state switching device is in the closed position;
a speed sensing circuit for controlling of the solid state switching device in response to a sensed engine speed, wherein the speed sensing circuit causes the solid state switching device to move to the open position in response to the sensed engine speed being a predetermined running speed that indicates the internal combustion engine is running; and
at least one control circuit positioned remotely from the outer housing and connected to the solid state switching device, wherein the control circuit is operable to control the operation of the solid state switching device.

19. The starter motor of claim 18, wherein the solid state switching device is electrically positioned between the commutator and ground.

20. The starter motor of claim 19, wherein the outer housing includes a back plate connected to ground, wherein the solid state switching device is electrically connected between one of the series of brushes and the back plate.

21. The starter motor of claim 18, wherein the solid state switching device is electrically positioned between the power supply and the commutator.

22. The starter motor of claim 18, wherein the at least one control circuit is a crank time limiting circuit that moves the solid state switching device to the open position based upon the duration of activation of the starter motor.

23. The starter motor of claim 18, wherein the solid state switching device is electrically positioned between the power supply and the commutator.

24. The starter motor of claim 18, further comprising a brush holder positioned within the outer housing to support the series of brushes relative to the commutator, wherein the solid state switching device is mounted to the brush holder.

25. The starter motor of claim 18, wherein the solid state switching device is connected to an ignition switch associated with the internal combustion engine, wherein the ignition switch is connected to the power supply and is moveable between a switch open position and a switch closed position such that when the ignition switch is in the switch closed position an activation voltage can be supplied from the power supply to the solid state switching device through the ignition switch, and wherein the solid state switching device only moves to the closed position when the activation voltage is supplied to the solid state switching device.

* * * * *